United States Patent
Horowitz et al.

[15] 3,685,265
[45] Aug. 22, 1972

[54] CUTTER CYLINDER LAWN MOWER IN WHICH THE CUTTER CYLINDER IS ARRANGED SO AS TO BE SELF-ENERGIZING

[72] Inventors: Alexandre Horowitz, Eindhoven; Bernard Joseph Beusink, Oerle, both of Netherlands

[73] Assignee: U.S. Philips Corporation, New York, N.Y.

[22] Filed: Sept. 25, 1970

[21] Appl. No.: 75,499

[30] Foreign Application Priority Data

Sept. 26, 1969    Netherlands..............6914592

[52] U.S. Cl................................................56/249
[51] Int. Cl.........................................A01d 55/20
[58] Field of Search..................56/249–254, 294, 56/10.3, 10.5, 17.5

[56] References Cited

UNITED STATES PATENTS

| | | | |
|---|---|---|---|
| 497,420 | 5/1893 | Stabler | 56/254 |
| 475,669 | 5/1892 | Coldwell et al. | 56/254 |
| 1,782,636 | 11/1930 | Stokes | 56/10.5 |
| 1,806,584 | 5/1931 | Borer | 56/17.5 |
| 2,253,924 | 8/1941 | Worthington | 56/253 |
| 2,521,262 | 9/1950 | Smith | 56/10.3 |
| 2,671,300 | 3/1954 | Kinkead | 56/249 |
| 3,271,939 | 9/1966 | Granger, Jr. et al. | 56/10.5 |

FOREIGN PATENTS OR APPLICATIONS 622,416    5/1949    Great Britain...............56/249

*Primary Examiner*—Russell R. Kinsey
*Attorney*—Frank R. Trifari

[57] ABSTRACT

A lawn mower of the cylinder type having a frame which comprises two side parts extending in the direction of movement. A pivot which extends at right angles to the direction of movement, is secured in the side parts of the frame and a substantially U-shaped auxiliary frame is pivotable about the pivot. The limbs of the auxiliary frame carry a rotatably drivable cutter cylinder which is spaced from the pivot. The cylinder blades cooperate with a ledger blade secured in the frame. The limbs of the auxiliary frame extend from the pivot in a direction opposite to the direction of movement. The level of the pivot is adjustable so that during the cutting operation the cutting resistance of the herbage to be cut gives rise to a tangential force which acts on the cutting edges of the cylinder blades and creates a couple which produces a torque which causes the auxiliary frame to tend to pivot about the pivot in a clockwise direction, with the result that during the cutting operation an increased pressure of engagement is produced between the cutting edges of the cooperating blades.

4 Claims, 5 Drawing Figures

CUTTER CYLINDER LAWN MOWER IN WHICH THE CUTTER CYLINDER IS ARRANGED SO AS TO BE SELF-ENERGIZING

The invention relates generally to lawn mowers, and more particularly to a lawn mower of the type having a cutter cylinder. Such lawn mowers typically have a frame which comprises two side parts and extend in the intended direction of the movement. The frame is usually provided with a pivot secured in the side part of the frame. An auxiliary frame is pivotally mounted for movement about the pivot. The auxiliary frame carries a rotatably drivable cutter cylinder. The blades of the cylinder cooperate with a ledger blade fixedly secured in the frame.

A lawn mower of this general type is described in British Pat. No. 622,416. The manner of adjusting the cutter cylinder relative to the ledger blade described in the said specification, may cause the cooperating cutting edges to be held in engagement with one another with an excessive pressure, one of the consequences of which is that excessive power is required.

It is an object of the present invention to provide a mower in which the required power may be smaller. In order to accomplish this objective the present invention provides that the pivot extends between the sides of the frame at right angles to the direction of movement, and the auxiliary frame is substantially U-shaped with its legs extending from the pivot in a direction opposite to the direction of rolling movement. In the present invention the pivot is situated at a level such that during the cutting operation, the cutting resistance of the herbage to be mowed produces a tangential force which acts on the cutting edges of the blades of the cylinder and creates a couple which brings about a torque which in turn causes the auxiliary frame to tend to rotate about the pivot in a clockwise direction, effecting an increased pressure of engagement between the cutting edges of the cooperating blades during the cutting operation.

The production of an increased pressure of engagement between the cutting edges of the cooperating blades during the cutting action is described in British Pat. No. 523,951. The increased engagement pressure between the cutting portions of the cutting edges of the cooperating blades during the cutting operation due to reaction forces of the herbage on the cutting portions, can be defined as a self-energizing effect. British Pat. No. 523,951 however is concerned with a self-energizingly arranged ledger blade, whereas the present invention relates to a self-energizingly arranged cutter cylinder.

In the known device using a self-energizingly arranged ledger blade, the latter is frequently deformed, in part because of its small mass. Such deformations may give rise to irregularity of the mowed surface.

An embodiment according to the invention has the additional advantage that the rigid attachment of the ledger blade prevents such deformation.

An advantageous embodiment, in which the cutter cylinder is driven by a motor, is characterized in that the auxiliary frame is equipped with an additional structure which supports the motor.

This additional structure is required because in the construction according to the invention, the drive for the cutter cylinder must be such as to exert no influence on the pivotability of the auxiliary frame. Otherwise, the self-energizing arrangement of the cutter cylinder may be hindered in the effectuation of the self-energization. If the frame should carry the motor, the cutter cylinder would have to be coupled to the driving motor in a manner such that a moment only is transmitted, which may be realized by means of a shaft.

A highly advantageous embodiment is characterized in that in known manner the motor is accommodated in the space bounded by the cutter cylinder.

This solution is constructionally simpler than the aforementioned solution in which the auxiliary frame is equipped with an additional structure for supporting the motor.

The accommodation of the driving motor for the cutter cylinder within this cylinder is described in U.S. Pat. No. 1,782,636.

The invention will now be described more fully with reference to the Figures of the drawing of an embodiment in which irrelevant component parts have been omitted, while further advantageous details will become apparent from the description of the drawings, in which.

Figure 1:
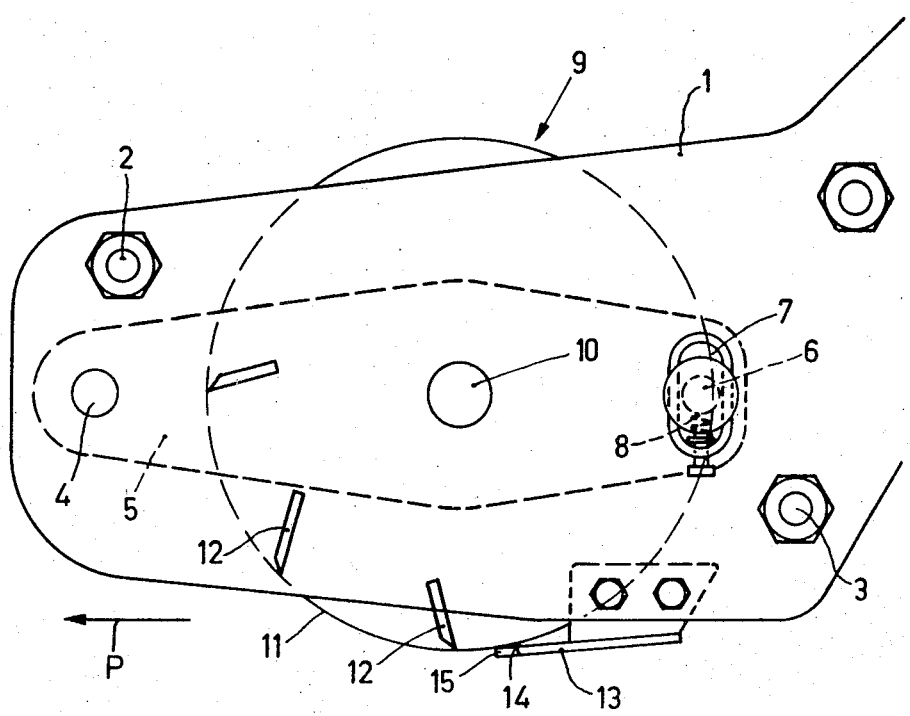
FIG. 1 is a side elevation of the frame of the mower.

The embodiment shown in the drawing has a frame 1 which substantially comprises two side parts which are spaced from one another by transverse rods 2 and 3. The rod 2 has the additional function of holding coarse matter from the field to be mowed clear of the working parts of the machine. Between the side parts of the frame 1 there is arranged a pivot 4 about which an auxiliary frame is pivotable.

This auxiliary frame is substantially U-shaped, the limbs extending from the pivot 4 in a direction opposite to the direction of movement (se the arrow P). The ends of the limbs of the auxiliary frame 5 more remote from the pivot 4 are provided with transversely extending outwardly protruding projections 6 which fit in slots 7 in the frame 1 for sliding movement.

The lower edges of the slots are each provided with a vertically displaceable helical spring 8 which has a substantially level characteristic and on which the respective projection 6 rests.

The auxiliary frame 5 further carries a cutter cylinder 9 having projecting transverse stub axles 10 which are secured in the limbs of the auxiliary frame 5 so as to be spaced from the pivot 4.

The cutter cylinder 9 comprises a cylindrical blade support 11 on which helical blades 12 are provided. The frame 1 further carries a ledger blade 13 which is rigidly secured to the frame 1 has a cutting edge 14, which when the mower is not used or is idling, is held against a cylindrical surface described by the cutting edges of the blades 12. This positioning of the cutting edges of the blades 12 relative to the cutting edge of the ledger blade 14 is effected by the force of the springs 8. Since these springs 8 are vertically displaceable, the said position of engagement may be accurately determined.

In such an engaged position comparatively little power is required to rotate the cutter cylinder 9. During the cutting of herbage, the resistance to cutting thereof will exert a reaction force on those parts of the cutting edges which cooperate during the cutting, which force has a substantially tangential direction relative to the cylindrical path described by the cylinder blades. The force will have little effect on the cutting edge 14 of the ledger blade 13, since the latter is rigidly supported in the frame 1. With respect to the cylinder-mounted blades 12 the force will create a couple which produces a torque owing to which the auxiliary frame 5 tends to pivot about the pivot 4 in a clockwise direction, resulting in an increased pressure of engagement between the cooperating cutting edges.

The value of this pressure increase will depend not only on the cutting resistance of the herbage to be cut but also on the angle between the line which joins the cutting portion of the cutting edge 14 of the ledger blade 13 to the pivot 4 of the auxiliary frame 5 and the tangent to the cylindrical path of the cylinder blades 12 at the point at which the cutting edge 14 of the ledger blade 13 comes into cutting contact with this path.

The desired increased pressure of engagement is obtainable by determining the positions of these lines in designing the mower.

In use, the cutting edges of the cylinder blades 12 must maintain uninterrupted contact with the cutting edge of the ledger blade 13. Owing to unavoidable manufacturing tolerances this regular contact is likely to be interrupted, with the result that the machine will jolt in operation.

In order to eliminate this likelihood the cutting portion of the ledger blade, which is the first to come into contact with the cutting edge of each successive cylinder blade, is provided with a guide member 15 which protrudes in the direction of movement. Any interruption of the engagement can be prevented by means of this guide member.

Figure 2:
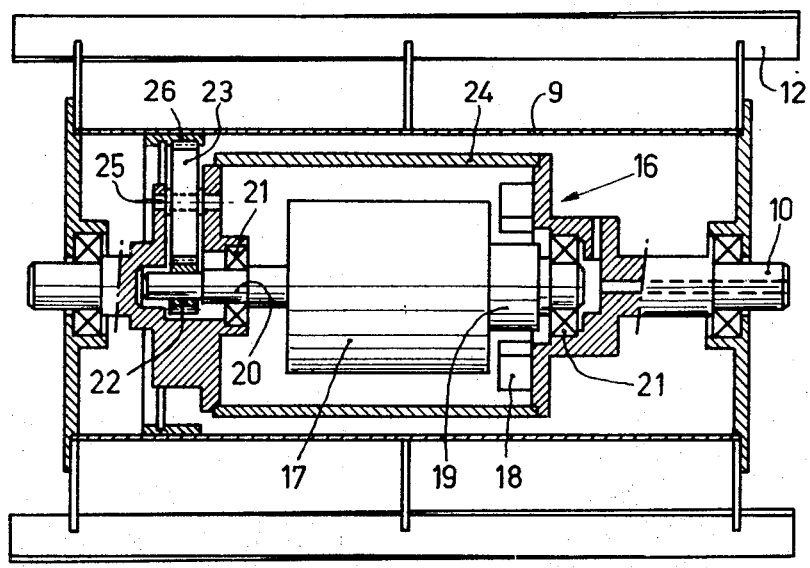
FIG. 2 is a longitudinal sectional view of the cutter cylinder with built-in motor.
Figure 3:
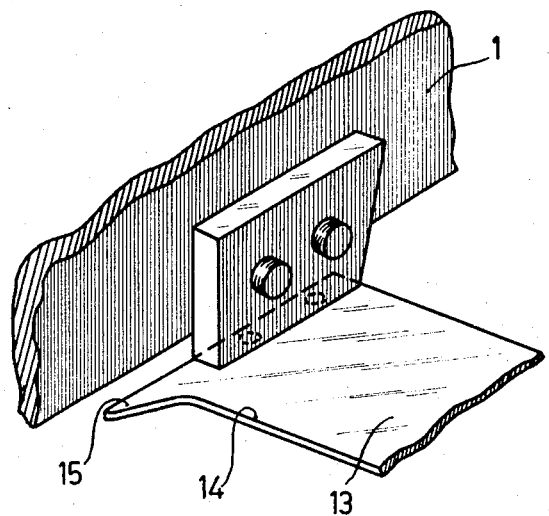
FIG. 3 is a perspective view of a portion of the ledger blade.
Figure 4:
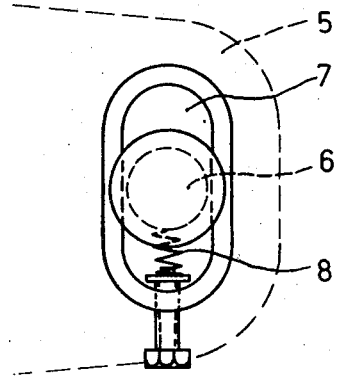
FIG. 4 is an elevation of a detail and FIG. 5 is a top plan view of the mower shown in FIG. 1.
Figure 5:
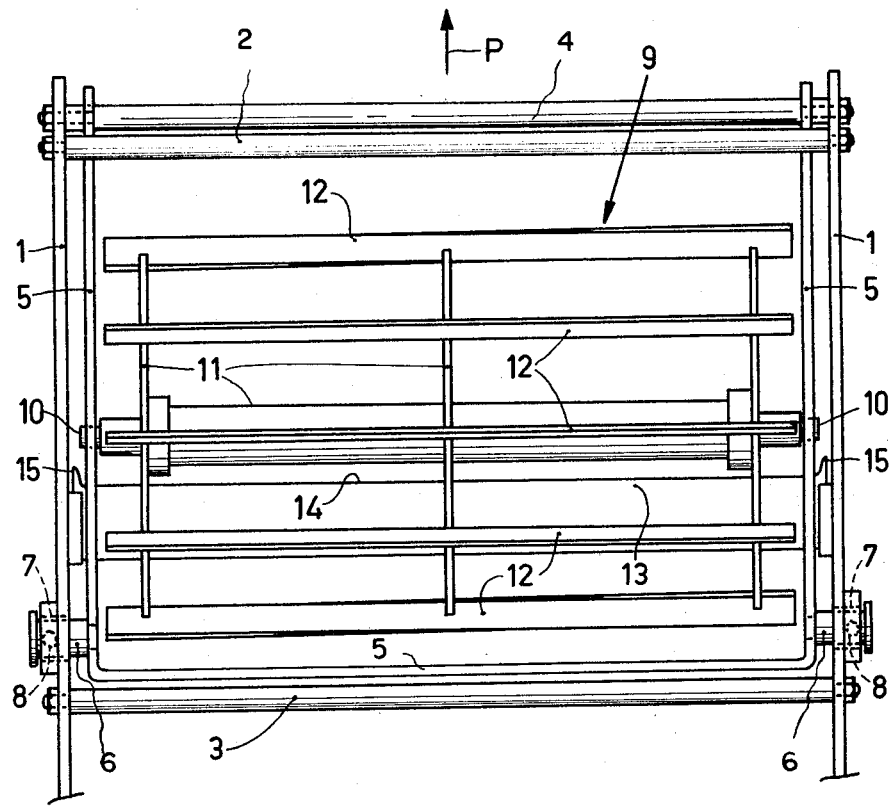

FIG. 2 shows the accommodation of a driving motor 16 within the cylinder 9. The motor 16 comprises a rotor 17, a carbon brush assembly 18 and a commutator 19. A rotor shaft 20 is supported in bearings 21. The rotor shaft 20 carries a pinion 22 which is drivably coupled with a gearwheel 23 mounted for rotation about a spindle 25 supported in a motor casing 24. The gearwheel 23 meshes with a toothed rim 26 rigidly secured to the inner wall of the cylinder 9.

The motor casing 24 has trunnions 10 which are rigidly secured in the limbs of the auxiliary frame 5.

What is claimed is:

1. A lawn mower of the cylinder type comprising a pair of spaced apart side frames, a plurality of transverse rods extended between the side frames so as to form a rigid frame construction, a pivot mounted between said side frames perpendicular to the direction of forward movement of the mower, a substantially U-shaped auxiliary frame member pivotally mounted on said pivot located between said side frames, the legs of said auxiliary frame member extending from said pivot in a direction opposite to the forward movement of the mower, a cutter cylinder rotatably mounted between the legs of said U-shaped frame member, a plurality of cutting blades located about the periphery of said cylinder, a ledger blade mounted between said side frames for cooperation with said cutting blades, adjusting means attached to said auxiliary frame so as to permit pivoting of said auxiliary frame about said pivot in a clockwise direction when resistance to the herbage to be cut is encountered, so that when said resistance is encountered a tangential force is produced which will act upon the cutting surfaces of the cutting blades thereby creating a couple to produce torque acting on the auxiliary frame to tend to said pivoting of said auxiliary frame about the pivot so that during the cutting operation an increased pressure of engagement is produced between the cutting edges of the cooperating blades.

2. The lawn mower according to claim 1 further comprising a casing mounted on said auxiliary frame within said cutting cylinder and a motor mounted within said casing for driving the mower.

3. The lawn mower according to claim 1 further comprising a driving motor mounted within said cutting cylinder and means connecting said motor with said cylinder for driving same.

4. The lawn mower according to claim 1 wherein said adjusting means comprises at least one projection attached to said auxiliary frame at the ends of the legs thereof remote from said pivot, said projection extending in an outward direction transverse to the direction of movement, a slot in the side frame for accommodating said projection and for allowing movement thereof, and a spring accommodated within said slot for engagement with and for supporting said projection.

* * * * *